Feb. 4, 1941.   L. M. POTTS   2,230,435
ORIENTATION AUTOMATIC ADJUSTING
Filed Nov. 17, 1938   3 Sheets-Sheet 2

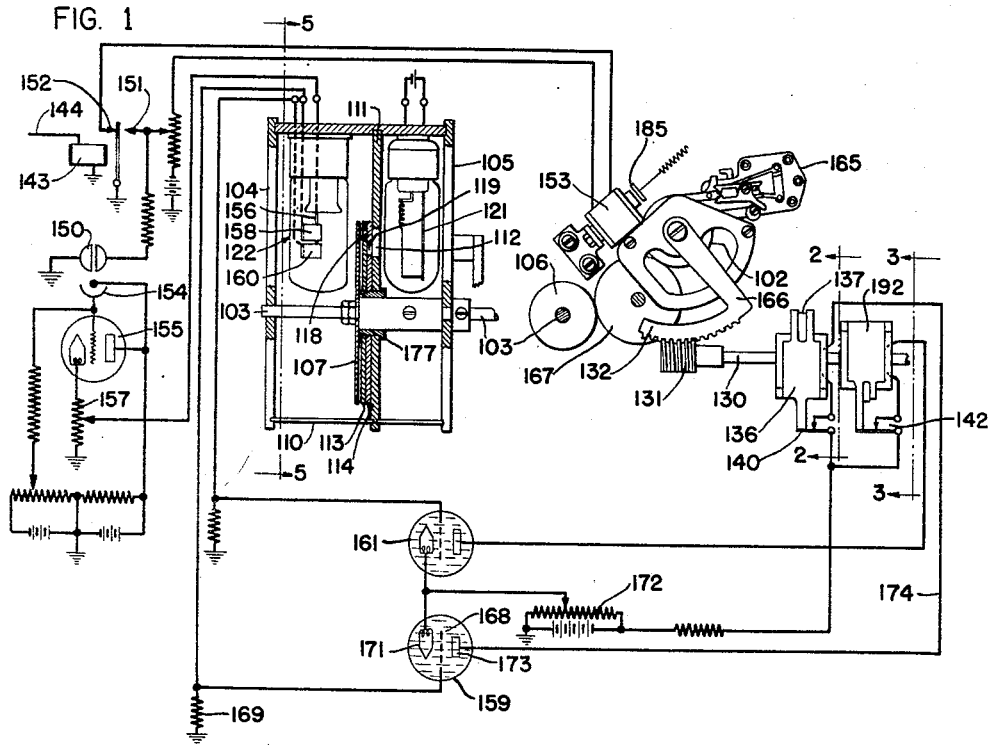

INVENTOR.
LOUIS M. POTTS
BY
H.B. Whitfield
ATTORNEY.

Feb. 4, 1941.　　　　　L. M. POTTS　　　　　2,230,435
ORIENTATION AUTOMATIC ADJUSTING
Filed Nov. 17, 1938　　　　3 Sheets-Sheet 3
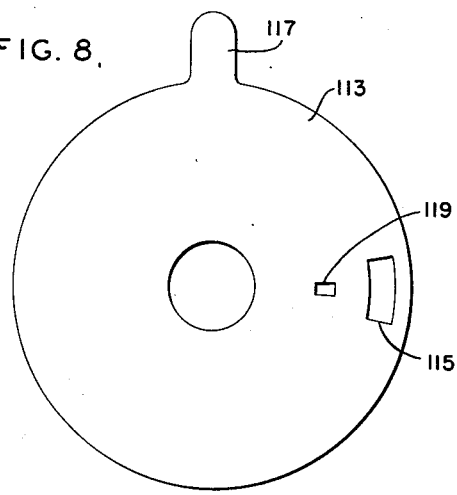
FIG. 8.
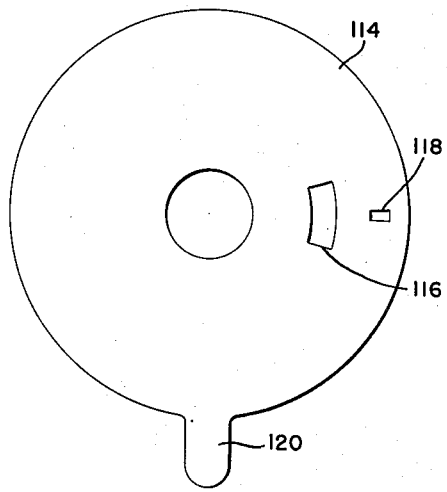
FIG. 9.
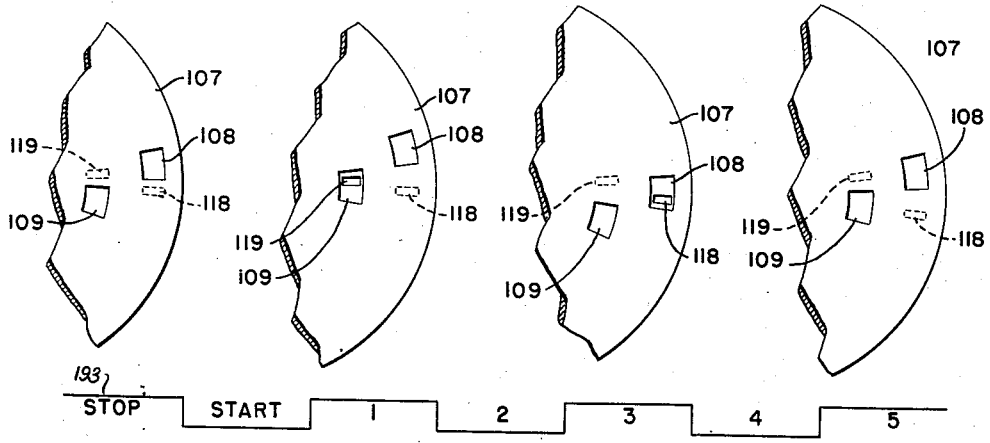
FIG. 10.　FIG. 11.　FIG. 12.　FIG. 13.
FIG. 14.
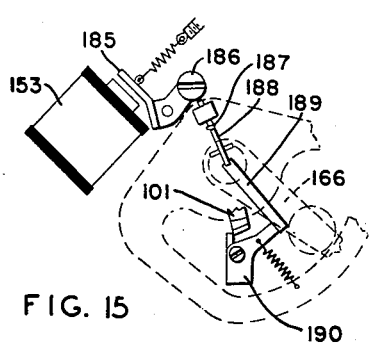
FIG. 15.
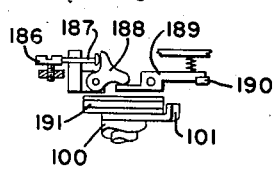
FIG. 16.
INVENTOR.
LOUIS M. POTTS
BY
J.H.B. Whitfield
ATTORNEY.

Patented Feb. 4, 1941

2,230,435

UNITED STATES PATENT OFFICE 2,230,435

ORIENTATION AUTOMATIC ADJUSTING

Louis M. Potts, Evanston, Ill., assignor to Teletype Corporation, Chicago, Ill., a corporation of Delaware Application November 17, 1938, Serial No. 240,942

14 Claims. (Cl. 178—69.5)

This invention pertains to telegraph systems and apparatus and specifically to telegraph systems involving apparatus for phasing automatically.

An object of this invention is to provide methods and apparatus for maintaining the transmitting and receiving apparatus in a predetermined phase relationship.

In many automatic telegraph systems a rotary signal distributor is used for transmitting signals and another rotary signal distributor is used at a receiving station to detect the signals. These distributors are driven in unison or in phase with one another by means provided for that purpose. For best signal reception, it is usual to have the signal distributor test each impulse of a code in as small an interval and as near the middle of the received impulse as possible. Due, however, to variations in the operation of the receiving apparatus or due to variations in the received signals, the relative time of occurrence of the testing and the middle of the received impulse may vary considerably and under certain conditions will cause errors if no corrections are applied.

In start-stop telegraph systems corrections are made manually. Accordingly, a special object of this invention is to make such corrections automatically.

A feature of the invention resides in accomplishing the objects by causing a reversal of line signals to flash a light and to sense this light by a shutter device operated by the receiving distributor, and under control of the sensing function to change the stopping position of the distributor and so automatically correct for noted variations whenever they occur.

The above and other objects of the invention are accomplished by arranging start-stop receiving instrumentalities with mechanism including oppositely directed ratchet wheels and electromagnet means under the joint control of the received signals and a locally controlled optical system for changing the stop and start position of the receiving instrumentality and thus compensate for the signal variations and assure that the desired portion of each signal impulse is effective.

A more complete understanding of the invention may be had from the following description taken in connection with the accompanying drawings in which, Fig. 1 shows a receiving circuit system, a portion of the apparatus of the system being shown in sectional view taken on line 1—1 of Fig. 5;

Figs. 2 and 3 show views of driving ratchets, pawls, and magnets, as indicated by lines 2—2 and 3—3 of Fig. 1;

Fig. 4 shows circuits of a transmitting station;

Figs. 8 and 9 show details of manually adjustable shutters shown also in assembly in Figs. 1 and 5;

Figure 5:
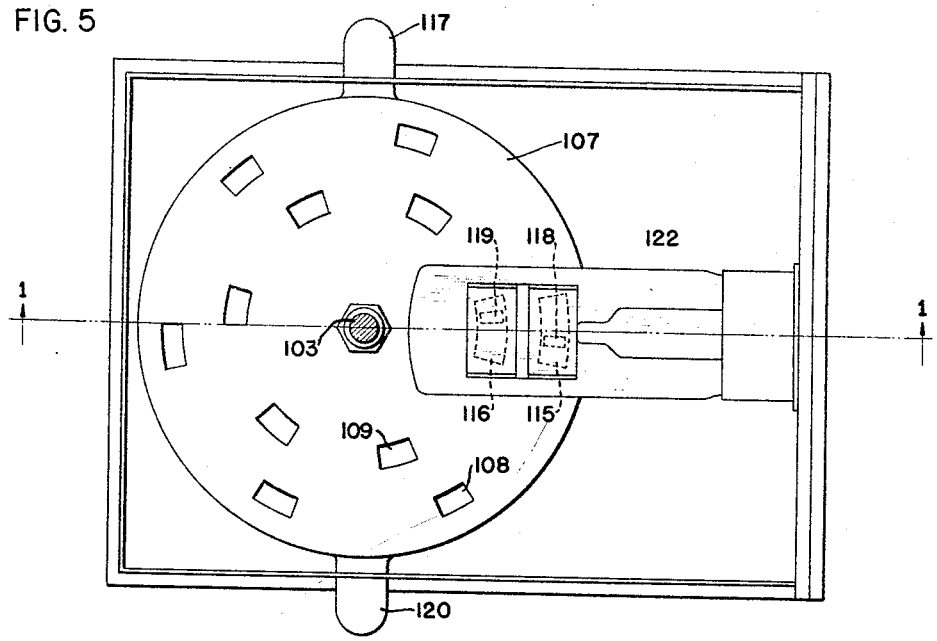
Fig. 5 shows a view of shutter and photoelectric cell assembly taken on line 5—5 of Fig. 1.
Figure 7:
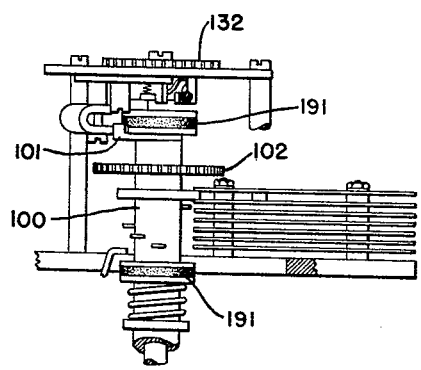
Fig. 7 shows the assembly of start-stop members which form a portion of Fig. 1.
Figure 6:
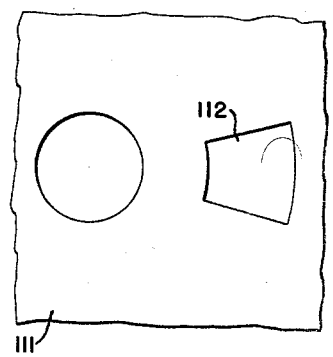
Fig. 6 shows a detail of a frame member shown in assembly in Fig. 1.

Figs. 10, 11, 12, and 13 show variant operating conditions of shutters shown also in assembly in Figs. 1 and 5;

Fig. 14 shows time relations between currents in the circuit system of Fig. 1; and Figs. 15 and 16 show further views of starting mechanism shown also in Fig. 7.

In general, a receiving start-stop member 100, Fig. 7, is controlled to stop and start by stop arm 101 and carries a gear wheel 102 which, through an idler gear 167, drives in start-stop manner a shutter shaft 103, Fig. 1, which is journaled in frame members 104 and 105. Shaft 103 bears gear 106 and shutter disc 107 having windows 108 and 109. Frame members 104, 105, and 110 are parts of a light box divided by septum 111 having a window 112. Mounted on a bushing in the septum 111 are adjustable discs 113 and 114, having large and small windows 115, 116, 118 and 119 and handles 117, 120. Mounted in the light box and in alignment with window 112 are exciter lamp 121 and a photocell 122 having one anode and two cathodes of which one cathode is positioned to receive light through window 118 and the other cathode is positioned to receive light through window 119.

There is provided a rotatable shaft 130 having a worm 131 in engagement with gear teeth on a segment 132 integral with a member of an orientation device, which member, when moved by the worm, will change the orientation of the telegraph receiver.

Fixed on shaft 130 are two oppositely faced ratchet wheels 133 and 134. Near ratchet 133 is a magnet 135 having armature 136 and pawl 137 to rotate the ratchet 133 and shaft 130 clockwise, Fig. 2. Just before completion of its motion, armature 136 opens a contact 140. Near ratchet 134 is a similar magnet 141 having an armature and pawl to rotate the ratchet 134 and shaft 130 counterclockwise, Fig. 3, and having a similar contact 142.

Receiving line relay 143 in circuit with line conductor 144 has a glow lamp 150 connected directly to contact 151 and connected also to contact 152 through receiving selector magnet 153, the circuit being such that the glow lamp 150 will be shunted out by contacts of the relay 143 except during transit time of the relay armature immediately subsequent to a change of signal in the transmission line. Time relations between signal currents in line conductor 144 and currents through lamp 150 are illustrated in Fig. 14, in which line 193 illustrates time values of marking and spacing currents in the line conductor 144 and line 194 illustrates time values of currents in the lamp 150 during the momentary transit time when the armature of relay 143 is not in engagement with either of its contacts 151 and 152. Each flash of lamp 150 will control photoelectric cell 154, which is connected to vacuum valve 155 which, in turn, is connected to the anode 156 of photoelectric cell 122 through resistance 157, thereby energizing the cell 122 for operation at each flash of the lamp 150. Cathode 158 is connected to the grid of gas filled valve 159 and cathode 160 is connected to the grid of gas filled valve 161.

Upon receipt of code combinations of impulses, disc 107 will rotate and windows 108 and 109 thereof will pass fixed windows 118 and 119 permitting flashes of light to reach the cathodes of cell 122. A flash upon cathode 158 simultaneous with a flash of lamp 150 will control cell 122 to permit current through valve 159 and magnet 135 to rotate shaft 130 and to change the orientation adjustment. If cathode 160 is illuminated, current through valve 161 and magnet 141 will rotate shaft 130 in reverse sense, and the orientation adjustment will be changed accordingly. When the orientation adjustment is correct, the flash of lamp 150 will occur between flashes from windows 118 and 119, and no current will flow through either magnet 135 or 141.

More specifically, Fig. 1 shows at 165 a single magnet selector or sword-and-T type fully described in Patent 1,904,164 granted to S. Morton et al. and shown in Fig. 1 thereof with details of magnet 153 and orientation arm 166 to which the gear segment 132 is added for the purposes of the present invention, and further shown in Fig. 20 of the Morton patent and in Figs. 15 and 16 of this application with stop arm 101 and cam drum 100 to which has been added a gear wheel 102 as shown in Figs. 1 and 7 of this application for the purposes of this invention.

In operation, the magnet 153 is normally energized by current through front contact 152 of line relay 143, thus holding its armature 185 in attracted position. Upon retraction of armature 185 in response to receipt of a spacing signal in line relay 143, a striker member 186, Figs. 15 and 16, pushes a sliding pin 187 which rocks a bell crank lever 188 which in turn rocks a latch lever 189 to unlatch a stop gate 190 thus releasing the stop arm 101 and permitting a friction clutch 191 to rotate the cam drum 100 of the sword-and-T selector. While the sword-and-T selector is used specifically for illustration herein of one application of the present invention, the invention is applicable to any selector or regenerative repeater having a rotary start-stop member, as for instance the regenerative repeater shown in Patent No. 2,104,273, granted January 4, 1938. Gear 102 through idler 167 drives gear 106 and shaft 103, equal numbers of teeth on gears 102 and 106 assuring the same angular speed in selector drum 100 and in shutter 107.

Gas filled discharge valve 159 has grid 168 grounded through resistor 169 and has filament 171 connected to potentiometer 172 at a contact point to make the filament sufficiently positive with respect to grid 168 to render valve 159 non-conducting. Upon simultaneous electrification of anode 156 and illumination of cathode 158 in cell 122, with resultant current through resistor 169 and change of potential on grid 168, current will flow thereafter independently of grid 168 through plate 173, conductor 174, winding of magnet 135, Fig. 2, closed contacts 140 and potentiometer 172, energizing the magnet 135 to operate armature 136 and pawl 137 to drive ratchet 133, shaft 130, segment 132 and orientation adjustment arm 166. Armature 136 will move flexible contact spring 140 and the flexible companion contact spring 175 will follow in engagement with spring 140 until armature 136 has performed the work designed, whereupon spring 175 engages an adjustable stop 176 and spring 140 moves further, disengaging itself from spring 175 and interrupting current through plate 173. Valve 159 then remains inert until the next operation, and armature 136 returns to the position shown. Valve 161, cathode 160, magnet 141 and contacts 142 operate in similar manner to move the orientation arm 166 in reverse sense.

Referring to Figs. 1 and 5, the shaft 103 bears fixed upon it a start-stop disc shutter 107 having five long radius windows 108 and five short radius windows 109 arranged in pairs, each pair preceding and following a radial line, the radii being spaced angularly to correspond to the angular spacing of cams on cam barrel 100, Fig. 7, and the radial location of the windows are such as to align them with cathodes 158 and 160 in photocell 122. Between start-stop shutter 107 and frame member 111 are two fixed shutters 113 and 114 adjustable manually by frictional rotation on a bushing 177 fixed in frame member 111. Shutter 113 is movable by a handle 117 projecting through a wall of the light box and has a small operative window 119 which limits and positions a beam from lamp 121 through window 112 in frame member 111, through clearance window 116 in shutter 114, through window 119 and thence to cathode 160, shutter 107 permitting. Shutter 113 has also a large window 115 which gives clearance through shutter 113 for a beam limited and positioned by window 118 in shutter 114. Shutter 114 is movable upon bushing 177 by handle 120 and has small operative window 118 and large window 116 for clearance of the beam through window 119. Shutters 113 and 114 are effective to vary the angles of shutter 107 at which the windows 108 and 109 in shutter 107 permit illumination of cathodes 158 and 160.

Figs. 10, 11, 12 and 13 show variant operating relations among the shutters. Fig. 10 shows the rotor disc 107 when it is in correct position corresponding to the time at which a reversal in the line condition occurs. It will be noted that if the armature of line relay 143 effects a transit at this time neither of the cathodes of cell 122 will be found illuminated and no current will be effected through cell 122.

In Fig. 11, the disc 107 has not rotated as far as is shown in Fig. 10 and if at this time a reversal of line current conditions occurs, light will be passing through the window 119 to illuminate cathode 160, effecting current through cell 122 to render the gas filled valve 161 conductive thereby supplying current to magnet 141 for operating armature 192, Figs. 1 and 3. Ratchet 134 and shaft 130 will be rotated counterclockwise, Fig. 3, while gear segment 122 and orientation arm 166 will be rotated to increase the orientation angle as defined above herein. When the selector drum 100 is next released, the disc 107 at the time of change of line signal will be in a more advanced position.

Fig. 12 shows the conditions when the rotor disc 107 has advanced too far when the reversal of line conditions occurs. In this instance, light will be passing through window 118 to illuminate cathode 158 and magnet 135 will be energized to move the orientation arm 166 in reverse sense.

Fig. 13 shows an adjustment of shutters 113 and 114 such that there is an appreciable angular distance between windows 118 and 119. With such an adjustment, a tolerance is permitted in operation of the shutter member 107 without effecting readjustment of the arm 166.

A signal applied to lamp 150 is detected by photoelectric cell 154, and amplified by electron discharge valve 155 and is applied to the anode 156 of cell 122. The present invention is not to be understood as limited by this detail, since many variations are possible, and a sufficient potential applied through a resistor and connected to anode 156 may be connected also to contacts 151, 152 when the grounded armature will shunt the anode and reduce the potential upon the anode except at transit time.

Fig. 4 illustrates a start-stop substation circuit including battery 180, resistor 181, transmitter contacts 182 and selector magnet 183 connected in series with line conductor 144.

The invention may be applied to any distributor having a rotary start-stop member and variations in details may be made to conform to the selector without departing from the spirit or scope of the appended claims.

What is claimed is:

1. A phase controlling system comprising a gas-filled space-discharge valve, an electromechanical phase-changing work device, a plate circuit through said valve and through said electromechanical device, means operative to start current in said plate circuit responsively to a received out-of-phase electrical signal impulse, and a pair of normally engaged electrical contacts operable by said device to disengage from each other when said device has reached a condition attained by virtue of having performed phase changing work.

2. An electric signal phase controlling system, comprising a gas filled electronic valve having a plate circuit, an electromechanical phase changing work device including a movable member for performing work, a circuit including said plate circuit, said electromechanical device and a plate circuit current terminating means, means responsive to a received signal for initiating said plate circuit current to operate said device, and means controlled by movement of said member to operate said terminating means when the work of said device has been performed.

3. An electric signal phase controlling system, a signal distributor, comprising a photoelectric cell, means to energize the anode of said cell in response to change of character of received character signals, a stroboscopic device responsive to change in character of some received character signals, means controlled by said stroboscopic device for illuminating a cathode of said cell, and means controlled by said cell when energized and illuminated to change the adjustment of said signal distributor and of said stroboscopic device with respect to some other received character signals.

4. An electric signal phase controlling system, comprising means to transmit code signals composed of a starting signal impulse and significant character signal impulses, a signal distributor, a photoelectric cell, means to energize the anode of said cell in response to change of character of received significant character signal impulses, a stroboscopic device responsive to a starting signal impulse, means controlled by said stroboscopic device for illuminating a cathode of said cell, and means controlled by said cell when energized and illuminated to change the adjustment of said signal distributor and of said stroboscopic device with respect to said significant character signal impulses.

5. A signal phase controlling system, comprising a signal distributor, a photoelectric cell having an anode and cathode, means for illuminating said cathode at regular intervals, means including a light sensitive device for energizing said anode at irregular intervals, and operating means for automatically adjusting said distributor and controlled by said cell when concurrently energized and illuminated.

6. A signal phase controlling system, comprising a signal distributor, a photoelectric cell having a light sensitive cathode illuminated at regularly recurring intervals, a further light sensitive device illuminated at irregularly recurring intervals, means to render said cell conducting when said cathode and said further device are illuminated concurrently, and means responsive to said cell when conducting to vary the condition of adjustment of said signal distributor.

7. An automatic orientation adjusting structure, comprising a printer selector, phase adjusting means therefor operable before and after the preferred instant of change of a received signal, further means operable only at the factual instant of change of a received signal, and means responsive to concurrent operation of said adjusting means and said further means and effective to operate said adjusting means.

8. An automatic orientation adjusting structure, comprising a signal distributor, a movable member responsive to a change in received line signal, stroboscopic means operable before and after the preferred moment of change of said movable member, further means operable only during the movement of said member, and means responsive to concurrent operation of said stroboscopic means and said further means and effective to change the orientation adjustment of said signal distributor and of said stroboscopic means.

9. An automatic orientation adjusting system, comprising a photoelectric cell, an adjustable signal distributor, a stroboscopic shutter driven in unison with said distributor, means including said shutter to illuminate said cell before and after the occurrence of the most favorable phase of said distributor for a change in received signal, means to render said cell responsive only at the change of received signal, and adjusting means controlled by said cell when responsive and controlling the adjustment of said signal distributor.

10. In a telegraph receiving device, means to generate short electric impulses corresponding to each change in character of a received character signal, a rotary signal distributing device, mechanical means to change the phase of the rotary device with respect to the time of the reversal, and means to control the mechanical means by the short impulses.

11. In a phase controlling device, an electronic device including a cathode and an anode, means independent of the electronic device to generate an intermittent voltage varying in timing according to a series of events, means to apply said voltage between the anode and the cathode, means to release from the cathode electrons according to another series of events and means to generate a control current according to the overlap of the two sets of events for adjusting said phase controlling device.

12. In a signaling system, a signal distributor, means to generate short electric impulses corresponding to each change of character of the character signaling current, an electrical circuit including two photosensitive elements, means to illuminate the two sensitive elements alternately, and means to generate a control current according to the coincidence of the electric impulses with the illumination for automatically adjusting the phase setting of said signal distributor.

13. A phase controlling system comprising a gas-filled space-discharge valve responsive to a received signal impulse, an electromechanical phase-changing device including a movable working member which operates mechanically to change the phase of a rotatable element, a normally closed electrical contact arranged to be opened by said working member, and a plate circuit through said space-discharge valve, through said phase-changing device and through said contact established in response to an out-of-phase condition occurring during a signal period.

14. In a start-stop telegraph system, a line conductor, a receiving relay in said line conductor and responsive to marking and spacing signals impressed on said line conductor, a rotary element, and means for varying the phase relation of said elements including a light sensitive device controlled during the rotation of said element, an electronic device controlled by the joint action of said light sensitive device and said receiving relay in response to a marking signal, and means controlled by said electronic device for correcting the phase relation of said element accordingly.

LOUIS M. POTTS.